United States Patent Office 2,761,861
Patented Sept. 4, 1956

2,761,861

PROCESS FOR THE MANUFACTURE OF NOVEL XANTHINE BASES AND SALTS THEREOF

Karl Doebel and Hans Spiegelberg, Basel, Switzerland, assignors to Hoffmann-La Roche Inc., Nutley, N. J., a corporation of New Jersey No Drawing. Application August 24, 1954,
Serial No. 451,943

Claims priority, application Switzerland
September 11, 1953

13 Claims. (Cl. 260—247.7)

The present invention concerns novel xanthine derivatives and a process for the manufacture thereof.

The invention provides novel xanthine bases and acid addition salts thereof, more particularly 1,3-dialkyl-7-oxo-alkyl-xanthines, wherein in the 7-side chain one methylene group adjacent to the oxo group carries a monosubstituted or disubstituted aminomethyl group. The said xanthine bases may be represented by the following formula

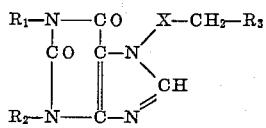

wherein $R_1$ and $R_2$ stand for lower alkyl radicals; $R_3$ represents the radical of a primary or secondary amine; and X represents a bivalent oxo-alkylene or oxoalkylidene group having 3 or 4 carbon atoms, the carbon atom carrying the radical —CH$_2$—R$_3$ being adjacent to the oxo group.

Preferred compounds comprised within the scope of the invention are those of the above formula, wherein $R_1$ and $R_2$ represent methyl groups and X represents the 2-oxopropylene or 2-oxopropylidene radical, i. e. —CH$_2$—CO—CH$_2$— and =CH—CO—CH$_3$ respectively. Examples of such compounds are 7-(piperidylmethyl-2-oxopropyl) - theophylline, 7 - (morpholinylmethyl - 2 - oxopropyl) - theophylline, 7 - (dimethylaminomethyl-2 - oxopropyl) - theophylline, 7 - (diethylaminomethyl-2-oxopropyl)-theophylline.

The above mentioned xanthine bases, as well as the acid addition salts thereof, for example the hydrochloride, the sulphate, the acetate, the tartrate, possess a strong dilatory action on the coronary arteries of the heart and may therefore be used as pharmaceuticals in heart diseases.

The invention further provides a process for the manufacture of the said xanthine derivatives, which process comprises reacting a xanthine compound of the general formula

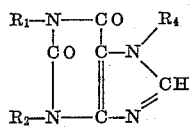

wherein $R_1$ and $R_2$ have the same meaning as already assigned thereto above, and $R_4$ represents an oxoalkyl group having 3 or 4 carbon atoms, with formaldehyde or a formaldehyde forming compound, and with a primary or secondary organic base or with a salt of the latter.

As may be exemplified with the reaction of 7-acetonyl-theophylline

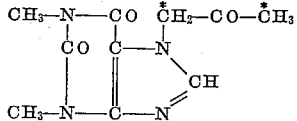

formaldehyde and the organic base, the process leads to two distinct series of end products, depending on whether the reaction is carried on in acid medium or in alkaline medium. The compounds of the two series represent structural isomers and the formation of the two series is presumably due to the fact that in acid medium one methylene group of the side chain in 7-position (marked by *) is activated whereas in alkaline medium the other methylene group of the side chain in 7-position is activated. The end products obtained in acid medium will be called hereinafter as belonging to series A, whereas the products obtained in alkaline medium will be deemed as belonging to series B.

To obtain the compounds of series A (acid conditions) the reaction is preferably carried out at elevated temperature. To this end, the starting materials—1,3-dialkyl-7-oxoalkyl-xanthine, formaldehyde or formaldehyde forming compound—may be mixed with a salt of the primary or secondary organic base, whereupon the mixture is heated for several hours until it is fully homogeneous, or, as a preferred alternative, it is refluxed in a solvent of sufficiently high boiling point, which does not take part in the reaction. In the latter alternative, small amounts of an acid may be added in order to keep the reaction mixture in acid condition. The duration of reaction is in general several hours. The end products are thus obtained in the form of the corresponding salts. The latter may be converted according to methods known per se into the free base.

If it is desired to obtain the compounds of series B, it is recommended to react the starting materials—1,3-dialkyl-7-oxoalkyl-xanthine, formaldehyde and primary or secondary amine at room temperature in a hydrophilic solvent or in water. The duration of reaction is in general several hours. In order to isolate the end products, it is recommended to add to the reaction mixture a solvent, which is miscible neither with water nor with the hydrophilic solvent; the end product thereby separates off. The reaction products are thus obtained in the form of the free base, from which acid addition salts may be prepared according to methods known per se.

Preferred starting materials are, on the one hand, 7-acetonyl-theophylline, and on the other hand, piperidine, morpholine, dimethyl amine and diethyl amine or the hydrohalides thereof, for example the hydrochloride. The formaldehyde is preferably added to the reaction mixture in the form of the solid paraformaldehyde or in the form of a 20–40% aqueous solution.

SERIES A

Example 1

10 parts by weight of 7-acetonyl-theophylline are heated on the water bath for several hours with 5.1 parts by weight of piperidine-hydrochloride and 3.6 parts by volume of a 38% aqueous formaldehyde solution, until the mixture is homogeneous. The water is then removed in vacuo and to the oily residue is added acetone or alcohol. The hydrochloride of 7-[3-(1-piperidyl-methyl)-2-oxopropyl]-theophylline of melting point 191–192° C. crystallizes out. The free base melts at 106–108° C.

Example 2

20 parts by weight of 7-acetonyl-theophylline are heated on the water bath with 7 parts by volume of a 38% aqueous formaldehyde solution and 10.5 parts by weight of morpholine-hydrochloride, until the mixture is homogeneous. The water formed is then eliminated in vacuo. By adding alcohol or acetone to the residue obtained 7-[3-(4-morpholinylmethyl)-2-oxopropyl]-theophylline-hydrochloride is produced. Melting point 206–208° C. The free base melts at 142–144° C.

*Example 3*

10 parts by weight of 7-acetonyl-theophylline are heated with 3.5 parts by volume of 38% aqueous formaldehyde solution and 3.62 parts by weight of dimethylamine-hydrochloride until the mixture is homogeneous. After removal of the water formed, the 7-(3-dimethylaminomethyl-2-oxopropyl)-theophylline-hydrochloride is precipitated by adding alcohol. Melting point 186–188° C. The free base melts at 103–104° C.

*Example 4*

10 parts by weight of 7-acetonyl-theophylline are heated with 3.5 parts by volume of 38% aqueous formaldehyde solution and 4.7 parts by weight of diethylamine-hydrochloride until the mixture is homogeneous. After removal of the water formed, the residue is digested with acetone, whereupon the 7-(3-β-diethylaminoethyl-2-oxopropyl)-theophylline-hydrochloride can be separated. Melting point 160–162° C. The free base melts at 76–77° C.

*Example 5*

10 parts by weight of 7-acetonyl-theophylline are dissolved in 100 parts by volume of dioxane containing 0.3 part by weight of hydrogen chloride, whereupon 6 parts by weight of piperidine-hydrochloride and 4 parts by volume of 38% aqueous formaldehyde solution are added. The mixture is refluxed for several hours then allowed to cool down. The reaction product is sucked off, thoroughly digested with alcohol and recrystallized from hot alcohol. Thus, 7-[3-(1-piperidylmethyl)-2-oxopropyl]-theophylline-hydrochloride of melting point 191–192° C. is obtained. The free base melts at 106–108° C.

*Example 6*

10 parts by weight of 7-acetonyl-theophylline are dissolved in 100 parts by volume of dioxane containing 0.3 part by weight of hydrogen chloride, whereupon 6 parts by weight of piperidine-hydrochloride and 6 parts by weight of paraformaldehyde are added. The mixture is refluxed for several hours and then allowed to cool down. The reaction product is sucked off, thoroughly digested with alcohol and recrystallized from hot alcohol. Thus, 7-[3-(1-piperidylmethyl)-2-oxopropyl]-theophylline-hydrochloride of melting point 191–192° C. is obtained. The free base melts at 106–108° C.

*Example 7*

10 parts by weight of 7-acetonyl-theophylline are dissolved in 100 parts by volume of dioxane containing 0.3 part by weight of hydrogen chloride, whereupon 6 parts by weight of morpholine-hydrochloride and 6 parts by weight of paraformaldehyde are added. The mixture is refluxed for several hours and allowed to cool down. The reaction product is sucked off, thoroughly digested with alcohol and recrystallized from hot alcohol. Thus, 7-[3-(4-morpholinylmethyl)-2-oxopropyl]-theophylline-hydrochloride of melting point 206–208° C. is obtained. The free base crystallizes from methanol and has the melting point 142–144° C.

*Example 8*

10 parts by weight of 7-acetonyl-theophylline are dissolved in 100 parts by volume of dioxane containing 0.5 part by weight of hydrogen chloride, whereupon 3.5 parts by weight of dimethylamine-hydrochloride and 6 parts by weight of paraformaldehyde are added. The mixture is refluxed, while stirring, for several hours and then allowed to cool down. The reaction product is sucked off, thoroughly digested with alcohol and reprecipitated from hot alcohol. Thus, 7-(3-dimethylaminomethyl-2-oxopropyl)-theophylline-hydrochloride of melting point 186–188° C. is obtained. The free base is crystallized from carbon tetrachloride/petroleum ether and has a melting point of 103–104° C.

*Example 9*

10 parts by weight of 7-acetonyl-theophylline are dissolved in 100 parts by volume of dioxane containing 0.5 part by weight of hydrogen chloride, whereupon 5 parts by weight of diethylamine-hydrochloride and 5 parts by weight of paraformaldehyde or 4 parts by volume of 38% aqueous formaldehyde solution are added. The solution is refluxed for several hours and then allowed to cool down. The reaction product is sucked off, thoroughly digested with alcohol and recrystallized from hot alcohol. After further reprecipitation from hot dioxane 7-(3-diethylaminomethyl-2-oxopropyl)-theophylline-hydrochloride of melting point of 160–162° C. is obtained. The free base recrystallizes from high boiling petroleum ether and has a melting point of 75–77° C.

SERIES B

*Example 10*

10 parts by weight of 7-acetonyl-theophylline are added, while cooling, to a mixture of 3.5 parts by volume of a 38% aqueous formaldehyde solution, 4.2 parts by volume of pure piperidine and 20 parts by volume of water. Thereafter, 100 parts by volume of benzene are added and the mixture is shaken for several hours. The benzene layer is then separated off in the separating funnel, the aqueous phase is extracted several times with benzene, the benzene extracts are combined and dried. The benzene is evaporated in vacuo and the residue is crystallized from alcohol. Thus, 7-[1-(1-piperidylmethyl)-2-oxopropyl]-theophylline of melting point 140–141° C. is obtained. The hydrochloride melts at 120° C. (with decomposition).

*Example 11*

10 parts by weight of 7-acetonyl-theophylline are added, while cooling, to a mixture of 3.5 parts by volume of a 38% aqueous formaldehyde solution, 4.5 parts by volume of pure morpholine and 20 parts by volume of water. Thereafter, 100 parts by volume of benzene are added and the mixture is shaken for several hours. The benzene layer is then separated in the separating funnel, the aqueous phase is extracted several times with benzene and the benzene extracts are combined and dried. The benzene is then evaporated in vacuo and the reside is converted into the hydrochloride. Thus, 7-[1-(4-morpholinylmethyl)-2-oxopropyl]-theophylline-hydrochloride of melting point 149–151° C. is obtained.

We claim:
1. 7-[di(lower alkyl)aminomethyl-2-oxopropyl]-theophylline.
2. 7-[di(lower alkyl)aminomethyl-2-oxopropyl]-theophylline hydrohalides.
3. 7-(4-morpholinylmethyl-2-oxopropyl)-theophylline.
4. 7-(1-piperidylmethyl-2-oxopropyl)-theophylline.
5. The process of claim 12, wherein 7-acetonyl-theophylline is used as starting material.
6. The process of claim 12 wherein a di(lower alkyl)-amine is used as the organic base.
7. The process of claim 12, wherein the reaction is carried out in alkaline medium at low temperature.
8. The process of claim 12, wherein the reaction is carried out in acid medium at elevated temperature.
9. The process of claim 8, wherein paraformaldehyde is used as one of the starting materials.
10. A process according to claim 12, wherein the reaction is conducted in acid medium by refluxing in a high boiling inert solvent.

11. A compound selected from the group consisting of xanthine bases having the formula

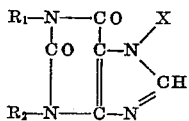

wherein $R_1$ and $R_2$ each represents a lower alkyl group, X represents a member of the group consisting of the radicals —$CH_2COCH_2CH_2$—$R_3$,

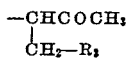

—$CH_2CH_2COCH_2CH_2$—$R_3$, and

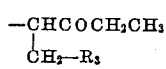

and $R_3$ in each of said radicals represents a member of the group consisting of lower alkylamino, di(lower alkyl)amino, piperidyl and morpholinyl and pharmaceutically acceptable acid addition salts thereof.

12. A process which comprises reacting a xanthine compound selected from the group having the formula

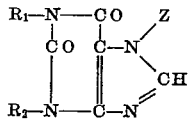

wherein $R_1$ and $R_2$ each represents a lower alkyl group and Z represents a member of the group consisting of the radicals —$CH_2COCH_3$, —$CH_2CH_2COCH_3$ and —$CH_2COCH_2CH_3$ with a member of the group consisting of formaldehyde and paraformaldehyde and with an organic base selected from the group consisting of lower alkylamines, di(lower alkyl)amines, piperidine and morpholine and salts of said bases.

13. 7 - [3 - (1 - piperidylmethyl) - 2 - oxopropyl] - theophylline.

No references cited.